US009112623B2

(12) United States Patent
Blaxland

(10) Patent No.: US 9,112,623 B2
(45) Date of Patent: Aug. 18, 2015

(54) ASYNCHRONOUS INTERACTION AT SPECIFIC POINTS IN CONTENT

(75) Inventor: Thomas Andrew Blaxland, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/153,675

(22) Filed: Jun. 6, 2011

(65) Prior Publication Data

US 2012/0311618 A1 Dec. 6, 2012

(51) Int. Cl.

| | |
|---|---|
| ***H04N 7/173*** | (2011.01) |
| ***H04H 60/33*** | (2008.01) |
| ***H04H 60/45*** | (2008.01) |
| ***H04H 60/73*** | (2008.01) |

(52) U.S. Cl.

CPC ............... *H04H 60/33* (2013.01); *H04H 60/45* (2013.01); *H04H 60/73* (2013.01)

(58) Field of Classification Search

CPC ....................... H04N 21/4622; H04N 7/17318
USPC .......................................... 725/110, 114, 117
See application file for complete search history.

(56) References Cited

U.S. PATENT DOCUMENTS

| | | | |
|---|---|---|---|
| 5,287,489 | A | 2/1994 | Nimmo et al. |
| 5,321,750 | A | 6/1994 | Nadan |
| 5,353,121 | A | 10/1994 | Young et al. |
| 5,485,221 | A | 1/1996 | Banker et al. |
| 5,583,563 | A | 12/1996 | Wanderscheid et al. |
| 5,589,892 | A | 12/1996 | Knee et al. |
| 5,592,551 | A | 1/1997 | Lett et al. |
| 5,594,509 | A | 1/1997 | Florin et al. |
| 5,613,057 | A | 3/1997 | Caravel |
| 5,621,456 | A | 4/1997 | Florin et al. |
| 5,657,072 | A | 8/1997 | Aristides et al. |
| 5,659,793 | A | 8/1997 | Escobar et al. |
| 5,666,645 | A | 9/1997 | Thomas et al. |
| 5,694,176 | A | 12/1997 | Bruette et al. |
| 5,826,102 | A | 10/1998 | Escobar et al. |
| 5,844,620 | A | 12/1998 | Coleman et al. |
| 5,850,218 | A | 12/1998 | LaJoie et al. |
| 5,852,435 | A | 12/1998 | Vigneaux et al. |

(Continued)

FOREIGN PATENT DOCUMENTS

| | | | |
|---|---|---|---|
| EP | 0624039 | A2 | 11/1994 |
| EP | 0963115 | A1 | 12/1999 |

(Continued)

OTHER PUBLICATIONS

Fernando Pereira, "The MPEG-4 Book", Prentice Hall, Jul. 10, 2002.

(Continued)

*Primary Examiner* — Nathan Flynn
*Assistant Examiner* — Sumaiya A Chowdhury
(74) *Attorney, Agent, or Firm* — Banner & Witcoff, Ltd.

(57) ABSTRACT

Systems, devices, and methods for allowing comments to be input at specific points in delivered content are provided. The systems, devices and methods may comprise specific content items, at least one request from a device for interacting with the specific content, and a comment provided by at least one user via the device in relation to the interacted one of the specific content. The comment may be recorded and later provided at the point of the comment to a second user while the second user plays back the specific content.

26 Claims, 8 Drawing Sheets

(56) References Cited

U.S. PATENT DOCUMENTS 5,860,073 A 1/1999 Ferrel et al.
5,883,677 A 3/1999 Hofmann
5,892,902 A 4/1999 Clark
5,892,905 A 4/1999 Brandt et al.
5,905,492 A 5/1999 Straub et al.
5,929,849 A 7/1999 Kikinis
5,990,890 A 11/1999 Etheredge
5,996,025 A 11/1999 Day et al.
6,002,394 A 12/1999 Schein et al.
6,005,561 A 12/1999 Hawkins et al.
6,008,803 A 12/1999 Rowe et al.
6,008,836 A 12/1999 Bruck et al.
6,016,144 A 1/2000 Blonstein et al.
6,025,837 A 2/2000 Matthews, III et al.
6,049,823 A 4/2000 Hwang
6,061,695 A 5/2000 Slivka et al.
6,067,108 A 5/2000 Yokote et al.
6,088,722 A 7/2000 Herz et al.
6,091,411 A 7/2000 Straub et al.
6,094,237 A 7/2000 Hashimoto
6,141,003 A 10/2000 Chor et al.
6,148,081 A 11/2000 Szymanski et al.
6,162,697 A 12/2000 Singh et al.
6,169,543 B1 1/2001 Wehmeyer
6,172,677 B1 1/2001 Stautner et al.
6,177,931 B1 1/2001 Alexander et al.
6,191,781 B1 2/2001 Chaney et al.
6,195,692 B1 2/2001 Hsu
6,205,582 B1 3/2001 Hoarty
6,219,839 B1 4/2001 Sampsell
6,239,795 B1 5/2001 Ulrich et al.
6,240,555 B1 5/2001 Shoff et al.
6,292,187 B1 9/2001 Gibbs et al.
6,292,827 B1 9/2001 Raz
6,295,057 B1 9/2001 Rosin et al.
6,314,569 B1 11/2001 Chernock et al.
6,317,885 B1 11/2001 Fries
6,345,305 B1 2/2002 Beck et al.
6,405,239 B1 6/2002 Addington et al.
6,415,438 B1 7/2002 Blackketter et al.
6,421,067 B1 7/2002 Kamen et al.
6,426,779 B1 7/2002 Noguchi et al.
6,442,755 B1 8/2002 Lemmons et al.
6,477,705 B1 11/2002 Yuen et al.
6,486,920 B2 11/2002 Arai et al.
6,522,342 B1 2/2003 Gagnon et al.
6,529,950 B1 3/2003 Lumelsky et al.
6,532,589 B1 3/2003 Proehl et al.
6,564,263 B1 5/2003 Bergman et al.
6,567,104 B1 5/2003 Andrew et al.
6,571,392 B1 5/2003 Zigmond et al.
6,591,292 B1 7/2003 Morrison et al.
6,621,509 B1 9/2003 Eiref et al.
6,636,887 B1 * 10/2003 Augeri .......................... 709/203
6,658,661 B1 12/2003 Arsenault et al.
6,678,891 B1 1/2004 Wilcox et al.
6,684,400 B1 1/2004 Goode et al.
6,731,310 B2 5/2004 Craycroft et al.
6,760,043 B2 7/2004 Markel
6,763,522 B1 7/2004 Kondo et al.
6,766,526 B1 7/2004 Ellis
6,806,887 B2 10/2004 Chernock et al.
6,857,128 B1 2/2005 Borden, IV et al.
6,910,191 B2 6/2005 Segerberg et al.
6,918,131 B1 * 7/2005 Rautila et al. .................. 725/34
7,028,327 B1 4/2006 Dougherty et al.
7,065,785 B1 6/2006 Shaffer et al.
7,103,904 B1 9/2006 Blackketter et al.
7,114,170 B2 9/2006 Harris et al.
7,152,236 B1 12/2006 Wugofski et al.
7,162,694 B2 1/2007 Venolia
7,162,697 B2 1/2007 Markel
7,197,715 B1 3/2007 Valeria
7,207,057 B1 4/2007 Rowe
7,213,005 B2 5/2007 Mourad et al.
7,221,801 B2 5/2007 Jang et al.
7,237,252 B2 6/2007 Billmaier
7,305,696 B2 12/2007 Thomas et al.
7,313,806 B1 12/2007 Williams et al.
7,337,457 B2 2/2008 Pack et al.
7,360,232 B2 4/2008 Mitchell
7,363,612 B2 4/2008 Satuloori et al.
7,406,705 B2 7/2008 Crinon et al.
7,440,967 B2 10/2008 Chidlovskii
7,464,344 B1 12/2008 Carmichael et al.
7,516,468 B1 4/2009 Deller et al.
7,523,180 B1 4/2009 DeLuca et al.
7,587,415 B2 9/2009 Gaurav et al.
7,624,416 B1 * 11/2009 Vandermolen et al. ....... 725/109
7,640,487 B2 12/2009 Amielh-Caprioglio et al.
7,702,315 B2 * 4/2010 Engstrom et al. .......... 455/412.1
7,703,116 B1 4/2010 Moreau et al.
7,721,307 B2 5/2010 Hendricks et al.
7,743,330 B1 6/2010 Hendricks et al.
7,752,258 B2 7/2010 Lewin et al.
7,958,528 B2 6/2011 Moreau et al.
8,266,652 B2 * 9/2012 Roberts et al. .................. 725/37
8,296,805 B2 10/2012 Tabatabai et al.
8,365,230 B2 1/2013 Chane et al.
8,381,259 B1 2/2013 Khosla
8,448,208 B2 5/2013 Moreau et al.
2001/0014206 A1 8/2001 Artigalas et al.
2001/0027563 A1 10/2001 White et al.
2001/0049823 A1 12/2001 Matey
2001/0056573 A1 12/2001 Kovac et al.
2001/0056577 A1 12/2001 Gordon et al.
2002/0010928 A1 1/2002 Sahota
2002/0016969 A1 2/2002 Kimble
2002/0023270 A1 2/2002 Thomas et al.
2002/0026642 A1 2/2002 Augenbraun et al.
2002/0041104 A1 4/2002 Graf et al.
2002/0042915 A1 4/2002 Kubischta et al.
2002/0059094 A1 5/2002 Hosea et al.
2002/0059586 A1 5/2002 Carney et al.
2002/0059629 A1 5/2002 Markel
2002/0067376 A1 6/2002 Martin et al.
2002/0069407 A1 6/2002 Fagnani et al.
2002/0070978 A1 6/2002 Wishoff et al.
2002/0078444 A1 6/2002 Krewin et al.
2002/0083450 A1 6/2002 Kamen et al.
2002/0100041 A1 7/2002 Rosenberg et al.
2002/0107973 A1 8/2002 Lennon et al.
2002/0108122 A1 8/2002 Alao et al.
2002/0124254 A1 9/2002 Kikinis
2002/0144269 A1 10/2002 Connelly
2002/0144273 A1 10/2002 Reto
2002/0147645 A1 10/2002 Alao et al.
2002/0152477 A1 10/2002 Goodman et al.
2002/0156839 A1 10/2002 Peterson et al.
2002/0169885 A1 11/2002 Alao et al.
2002/0170059 A1 11/2002 Hoang
2002/0171691 A1 11/2002 Currans et al.
2002/0171940 A1 11/2002 He et al.
2002/0184629 A1 12/2002 Sie et al.
2002/0188944 A1 12/2002 Noble
2002/0196268 A1 12/2002 Wolff et al.
2002/0199190 A1 12/2002 Su
2003/0001880 A1 1/2003 Holtz et al.
2003/0005444 A1 1/2003 Crinon et al.
2003/0005453 A1 1/2003 Rodriguez et al.
2003/0014752 A1 1/2003 Zaslavsky et al.
2003/0014753 A1 1/2003 Beach et al.
2003/0018755 A1 1/2003 Masterson et al.
2003/0023970 A1 1/2003 Panabaker
2003/0025832 A1 2/2003 Swart et al.
2003/0028873 A1 2/2003 Lemmons
2003/0041104 A1 2/2003 Wingard et al.
2003/0051246 A1 3/2003 Wilder et al.
2003/0056216 A1 3/2003 Wugofski et al.
2003/0056218 A1 3/2003 Wingard et al.
2003/0058948 A1 3/2003 Kelly et al.
2003/0066081 A1 4/2003 Barone et al.
2003/0067554 A1 4/2003 Klarfeld et al.
2003/0070170 A1 4/2003 Lennon

(56) References Cited

U.S. PATENT DOCUMENTS

| | | | | |
|---|---|---|---|---|
| 2003/0079226 | A1 | 4/2003 | Barrett | |
| 2003/0084443 | A1 | 5/2003 | Laughlin et al. | |
| 2003/0084444 | A1 | 5/2003 | Ullman et al. | |
| 2003/0084449 | A1 | 5/2003 | Chane et al. | |
| 2003/0086694 | A1 | 5/2003 | Davidsson | |
| 2003/0093790 | A1 | 5/2003 | Logan et al. | |
| 2003/0093792 | A1 | 5/2003 | Labeeb et al. | |
| 2003/0097657 | A1 | 5/2003 | Zhou et al. | |
| 2003/0110500 | A1 | 6/2003 | Rodriguez | |
| 2003/0110503 | A1 | 6/2003 | Perkes | |
| 2003/0115219 | A1 | 6/2003 | Chadwick | |
| 2003/0115612 | A1 | 6/2003 | Mao et al. | |
| 2003/0126601 | A1 | 7/2003 | Roberts et al. | |
| 2003/0132971 | A1 | 7/2003 | Billmaier et al. | |
| 2003/0135464 | A1 | 7/2003 | Mourad et al. | |
| 2003/0140097 | A1 | 7/2003 | Schloer | |
| 2003/0151621 | A1 | 8/2003 | McEvilly et al. | |
| 2003/0172370 | A1 | 9/2003 | Satuloori et al. | |
| 2003/0182663 | A1* | 9/2003 | Gudorf et al. | 725/110 |
| 2003/0189668 | A1 | 10/2003 | Newnam et al. | |
| 2003/0204814 | A1 | 10/2003 | Elo et al. | |
| 2003/0204846 | A1 | 10/2003 | Breen et al. | |
| 2003/0204854 | A1 | 10/2003 | Blackketter et al. | |
| 2003/0229899 | A1 | 12/2003 | Thompson et al. | |
| 2004/0003402 | A1 | 1/2004 | McKenna | |
| 2004/0019900 | A1 | 1/2004 | Knightbridge et al. | |
| 2004/0019908 | A1 | 1/2004 | Williams et al. | |
| 2004/0031015 | A1 | 2/2004 | Ben-Romdhane et al. | |
| 2004/0039754 | A1 | 2/2004 | Harple | |
| 2004/0078814 | A1 | 4/2004 | Allen | |
| 2004/0107437 | A1 | 6/2004 | Reichardt et al. | |
| 2004/0107439 | A1 | 6/2004 | Hassell et al. | |
| 2004/0133923 | A1 | 7/2004 | Watson et al. | |
| 2004/0136698 | A1 | 7/2004 | Mock | |
| 2004/0172648 | A1 | 9/2004 | Xu et al. | |
| 2004/0194136 | A1 | 9/2004 | Finseth et al. | |
| 2004/0221306 | A1 | 11/2004 | Noh | |
| 2004/0226051 | A1 | 11/2004 | Carney et al. | |
| 2005/0005288 | A1 | 1/2005 | Novak | |
| 2005/0015804 | A1 | 1/2005 | LaJoie et al. | |
| 2005/0028208 | A1 | 2/2005 | Ellis et al. | |
| 2005/0086172 | A1 | 4/2005 | Stefik | |
| 2005/0149972 | A1 | 7/2005 | Knudson | |
| 2005/0155063 | A1 | 7/2005 | Bayrakeri et al. | |
| 2005/0262542 | A1* | 11/2005 | DeWeese et al. | 725/106 |
| 2005/0283800 | A1 | 12/2005 | Ellis et al. | |
| 2005/0287948 | A1 | 12/2005 | Hellwagner et al. | |
| 2006/0059525 | A1 | 3/2006 | Jerding et al. | |
| 2006/0080707 | A1 | 4/2006 | Laksono | |
| 2006/0105793 | A1 | 5/2006 | Gutowski et al. | |
| 2006/0156336 | A1 | 7/2006 | Knudson et al. | |
| 2006/0200842 | A1 | 9/2006 | Chapman et al. | |
| 2006/0206912 | A1 | 9/2006 | Klarfeld et al. | |
| 2006/0248572 | A1 | 11/2006 | Kitsukama et al. | |
| 2007/0271587 | A1 | 11/2007 | Rowe | |
| 2008/0037722 | A1* | 2/2008 | Klassen | 379/88.12 |
| 2008/0060011 | A1 | 3/2008 | Kelts | |
| 2008/0189740 | A1 | 8/2008 | Carpenter et al. | |
| 2008/0196070 | A1 | 8/2008 | White et al. | |
| 2008/0235725 | A1 | 9/2008 | Hendricks | |
| 2008/0276278 | A1 | 11/2008 | Krieger et al. | |
| 2008/0288644 | A1* | 11/2008 | Gilfix et al. | 709/227 |
| 2008/0317233 | A1* | 12/2008 | Rey et al. | 379/210.01 |
| 2009/0019485 | A1 | 1/2009 | Ellis et al. | |
| 2009/0024629 | A1* | 1/2009 | Miyauchi | 707/9 |
| 2009/0094632 | A1 | 4/2009 | Newnam et al. | |
| 2009/0164904 | A1* | 6/2009 | Horowitz et al. | 715/723 |
| 2009/0222872 | A1* | 9/2009 | Schlack | 725/114 |
| 2009/0228441 | A1* | 9/2009 | Sandvik | 707/3 |
| 2009/0271829 | A1 | 10/2009 | Larsson et al. | |
| 2009/0292548 | A1* | 11/2009 | Van Court | 705/1 |
| 2010/0077057 | A1 | 3/2010 | Godin et al. | |
| 2010/0175084 | A1 | 7/2010 | Ellis et al. | |
| 2010/0223640 | A1 | 9/2010 | Reichardt et al. | |
| 2010/0250190 | A1 | 9/2010 | Zhang et al. | |
| 2010/0251284 | A1 | 9/2010 | Ellis et al. | |
| 2011/0055282 | A1* | 3/2011 | Hoving | 707/802 |
| 2011/0058101 | A1* | 3/2011 | Earley et al. | 348/461 |
| 2011/0087348 | A1* | 4/2011 | Wong | 700/94 |
| 2011/0093909 | A1* | 4/2011 | Roberts et al. | 725/110 |
| 2011/0209180 | A1 | 8/2011 | Ellis et al. | |
| 2011/0214143 | A1* | 9/2011 | Rits et al. | 725/34 |
| 2011/0219419 | A1 | 9/2011 | Reisman | |
| 2011/0246495 | A1 | 10/2011 | Mallinson | |
| 2011/0247042 | A1 | 10/2011 | Mallinson | |
| 2012/0002111 | A1 | 1/2012 | Sandoval et al. | |
| 2012/0054811 | A1 | 3/2012 | Spears | |
| 2012/0117151 | A1 | 5/2012 | Bill | |
| 2012/0227073 | A1 | 9/2012 | Hosein et al. | |
| 2012/0324002 | A1 | 12/2012 | Chen | |
| 2013/0111514 | A1 | 5/2013 | Slavin et al. | |
| 2013/0262997 | A1 | 10/2013 | Markworth et al. | |
| 2013/0326570 | A1 | 12/2013 | Cowper et al. | |
| 2013/0332852 | A1 | 12/2013 | Castanho et al. | |
| 2013/0347018 | A1 | 12/2013 | Limp et al. | |

FOREIGN PATENT DOCUMENTS

| | | | |
|---|---|---|---|
| EP | 1058999 | A1 | 12/2000 |
| EP | 1080582 | A1 | 3/2001 |
| GB | 2323489 | A | 9/1998 |
| WO | 9963757 | A1 | 12/1999 |
| WO | 0011869 | A1 | 3/2000 |
| WO | 0033576 | A1 | 6/2000 |
| WO | 01/10115 | A1 | 2/2001 |
| WO | 0110115 | A1 | 2/2001 |
| WO | 0182613 | A1 | 11/2001 |
| WO | 02063426 | A2 | 8/2002 |
| WO | 02063471 | A2 | 8/2002 |
| WO | 02063851 | A2 | 8/2002 |
| WO | 02063878 | A2 | 8/2002 |
| WO | 03009126 | A1 | 1/2003 |
| WO | 03/026275 | A2 | 3/2003 |
| WO | 2011/053271 | A1 | 5/2011 |
| WO | 2012/094105 | A1 | 7/2012 |
| WO | 2012/154541 | A1 | 11/2012 |

OTHER PUBLICATIONS

Michael Adams, "Open Cable Architecture", Cisco Press, Dec. 3, 1999.

Andreas Kraft and Klaus Hofrichter, "An Approach for Script-Based Broadcast Application Production", Springer-Verlag Brling Heidelberg, pp. 74-82, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

Shim, et al., "A SMIL Based Graphical Interface for Interactive TV", Internet Tech. Laboratory Dept. of Comp. Engineering, San Jose State University, pp. 257-266.

Yoon, et al., "Video Gadget: MPET-7 Based Audio-Visual Content Indexing and Browsing Engine", LG Electronics Institute of Technology, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

Boronat F et al: "Multimedia group and inter-stream synchronization techniques: A comparative study", Information Systems. Pergamon Press. Oxford. GB. vol. 34. No. 1. Mar. 1, 2009. pp. 108-131. XP025644936.

(56) References Cited

OTHER PUBLICATIONS

Extended European Search Report—EP14159227.9—Mailing Date: Sep. 3, 2014.

Canadian Office Action—CA 2,685,833—Dated Jan. 22, 2015.

European Extended Search Report—EP 13192112.4—Dated May 11, 2015.

* cited by examiner

600

| User | Text of Comment | Video Comment Is In | Timestamp of Comment |
|---|---|---|---|
| Jed Red 610 | This show is amazingly funny. 620 | Curb Your Enthusiasm, Episode 10 630 | 3:35:35 640 |
| Jean Green | Jed, you are right, I keep having to rewind because I am laughing so hard. | Curb Your Enthusiasm, Episode 10 | 3:35:35 |
| | | | |
| | | | |
| | | | |
| | | | |
| | | | |
| | | | |

FIG. 6

ASYNCHRONOUS INTERACTION AT SPECIFIC POINTS IN CONTENT

FIELD OF THE DISCLOSURE

Aspects of the present disclosure are directed to devices, systems and methods of asynchronous interaction, and, to devices, systems and methods for asynchronous interaction at specific points in content playback.

BACKGROUND OF THE DISCLOSURE

Individuals devote time to viewing or listening to, or otherwise consuming (e.g., recording) entertainment content. Television, which is one form of such entertainment, has become a common part of every day life. Fans of television engage in regular conversation, often spirited in nature, regarding programming, shows, and movies watched. In this regard, there are many websites, blogs, emails, and telephone calls concerning television programming, and content in general.

However, as content becomes increasingly non-linear and available on-demand, the ability to, e.g., watch shows at different times, that is, asynchronously, makes interactivity and community consumption very difficult to achieve

SUMMARY OF THE DISCLOSURE

Aspects of this disclosure relate to systems, devices and methods of recording at least one asynchronous interaction at a specific time in content (e.g., audiovisual content) playback. The systems, devices and methods may include receiving a comment from a first user associated with an audiovisual playback, correlating the received comment with at least the specific time of the comment in the audiovisual playback, identifying the first user, recording at least the correlating and the identifying data in at least one database, and providing the received comment to a second user. A retrieval of the playback by the second user, affiliated with the first user, may effectuate the providing of the first user's comment to the second user at the appropriate point in time in the content. The disclosure may further include repeating the receiving, correlating, identifying, and recording for a second comment from the second user, wherein the second comment may be provided to the first user and/or to at least one third user.

Systems, devices, and methods for asynchronous commenting, or other data insertion, at specific times in content may include a vault server containing specific content, a device for interacting between a user and the vault server, wherein the device enables the user to request specific content, an edge server for servicing at least one request from the device for the specific content from the vault server, and a comment provided by the user to the y device for relation to the specific content and to a time within the specific content. The relation and the user may be recorded for playback to a second user. The second user may be a contact of the first user. The disclosure thus further includes an address book comprising contacts of one or more of the users and may further include an alert for alerting a user to the comment.

The disclosure provides for asynchronous commentary in delivered content and may include at least one storage element containing the delivered content and for servicing at least one request from a user device for the delivered content, a comment input to the user device adapted for accepting at least one comment related to a first time in the delivered content, and a second user device adapted to receive the at least one comment at the first time during a playback of the delivered content.

The devices, systems and methods of the present disclosure may provide for comment and messaging regarding asynchronously selected, distributed, and/or viewed audiovisual content, including enabling messaging for friends and contacts regarding television, (computer) programs/applications, movies, advertisements, songs, documents, guides (e.g., interactive programming guides, electronic programming guides), pictures/images, or other content.

BRIEF DESCRIPTION OF THE FIGURES

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

FIG. 6 illustrates a tabular information storage in accordance with some aspects of the disclosure;

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is to be understood that the figures and descriptions of the disclosure have been simplified to illustrate elements that are relevant for a clear understanding, while eliminating, for the purpose of brevity, many other elements found in content delivery and interactivity systems and methods. Those of ordinary skill in the art will thus recognize that other elements and/or steps are desirable and/or required in implementing the disclosure. However, because such elements and steps may be known in the art, a discussion of such elements and steps is not provided herein. The disclosure herein is directed to all variations and modifications of such elements and methods known to those skilled in the art.

Figure 1:
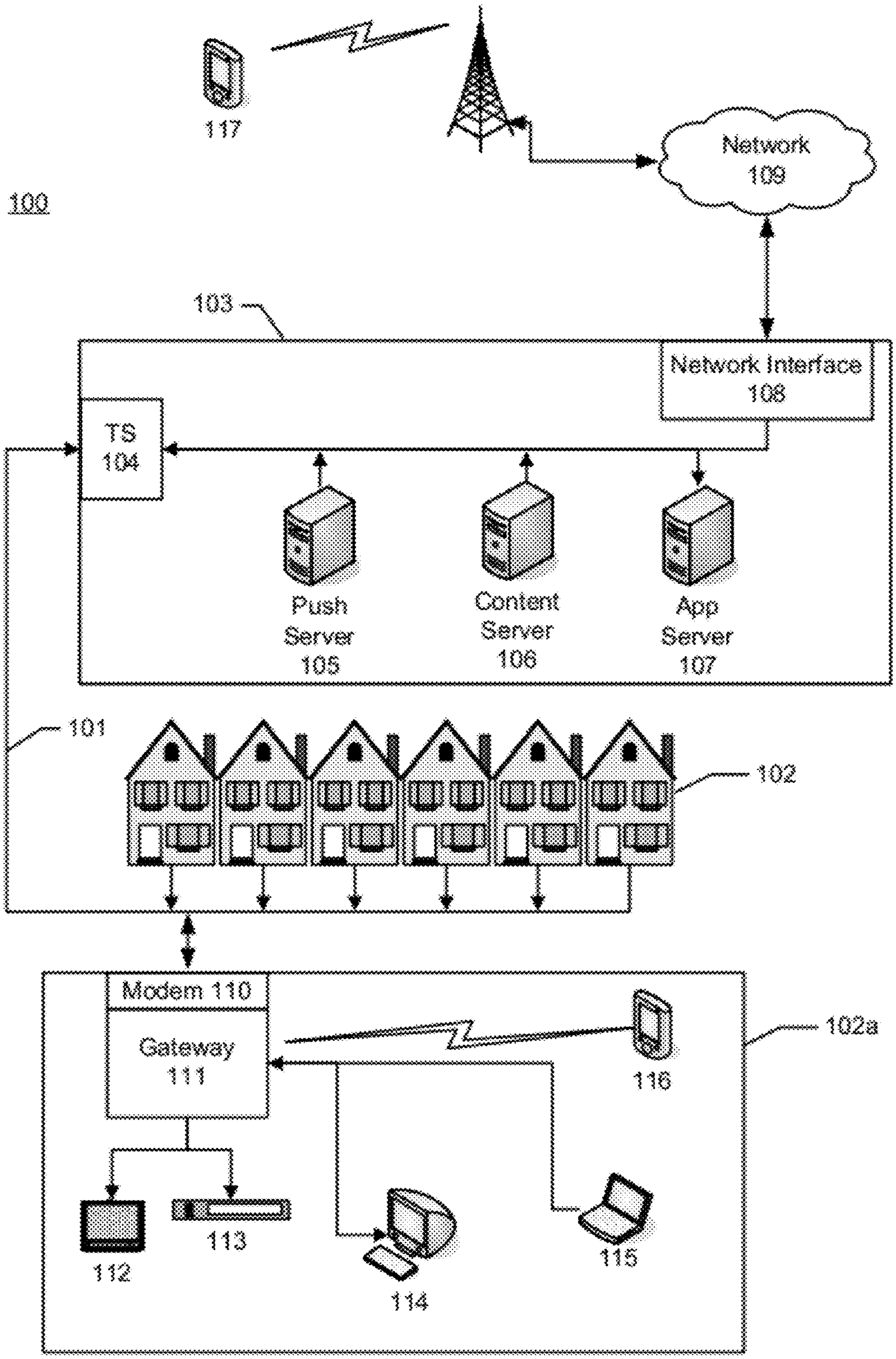
FIG. 1 illustrates an example information distribution network.

FIG. 1 illustrates an example distribution network 100 on which many of the various features described herein may be implemented. Network 100 may be any type of distribution network, such as satellite, telephone, cellular, wireless, etc. One example may be an optical fiber network, a coaxial cable network or a hybrid fiber/coax distribution network. Such networks 100 may use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split may introduce a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that may be configured to provide content to users in the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102*a* may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in premises 102*a* to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102*a*, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
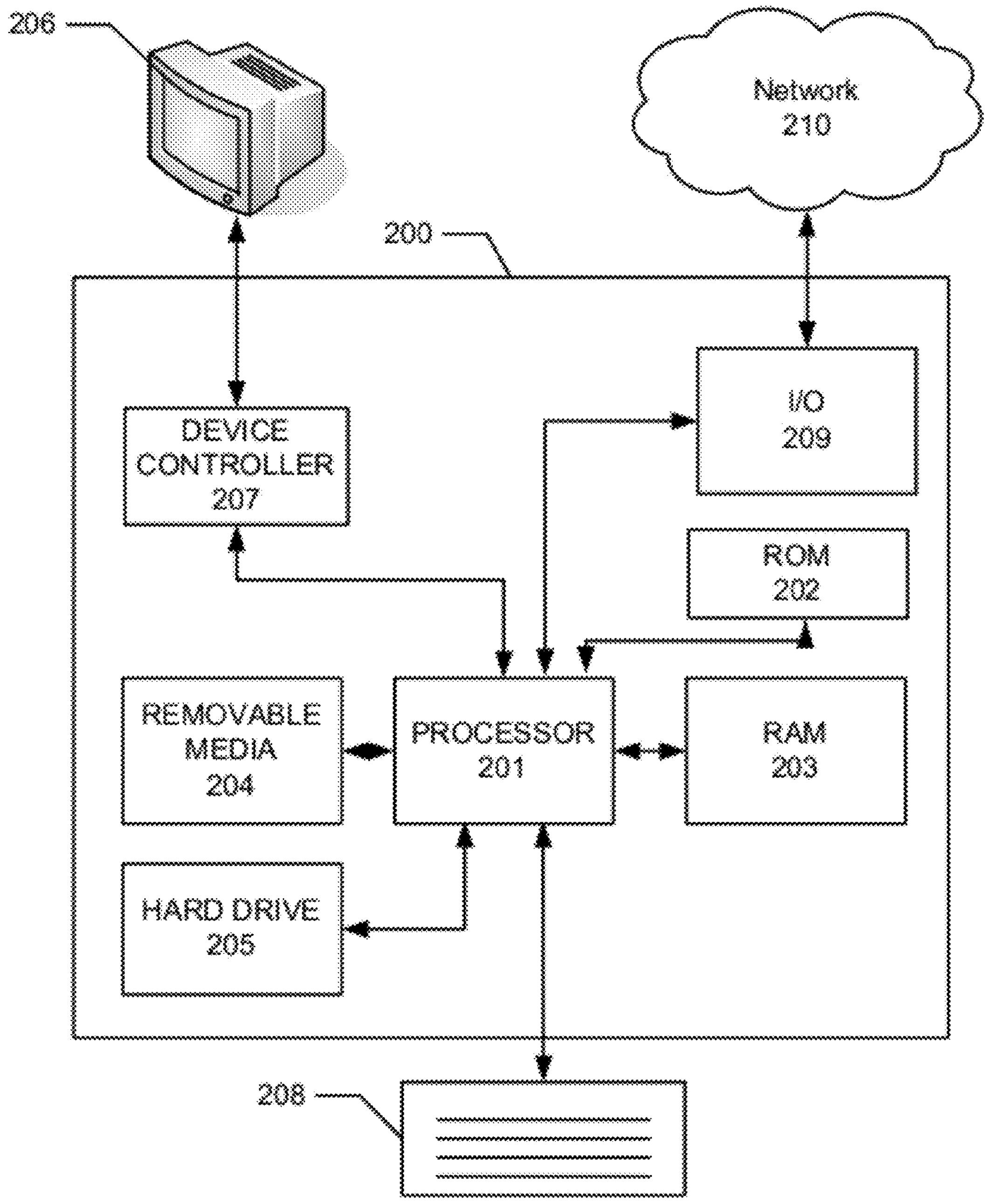
FIG. 2 illustrates an example hardware platform on which the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

According to one or more aspects of the disclosure, a user may insert a comment at a specific point in content (e.g., audio, visual, or audiovisual content). As described herein, non-linear and/or asynchronous audio, visual, or audiovisual playback may allow for different users to select content at different times. In some embodiments, a user may select content in order to listen to and/or view that content. The comment(s) entered by a user may be transmitted to select individuals or services, such as friends of the commentator/user, including, for example, address book contacts, Facebook® friends, Twitter® friends and the like. When one of the select individuals views or listens to the same content, such as at a later time, the select individual may see or have the option to see or hear the comment at the correspondent, specific point in the playback.

Further, one of the select individuals may also leave a comment, such as a sub comment or a second comment, in addition to the first comment. The sub comment may be linked or unlinked to the first comment, as defined by the individual leaving the sub comment. The sub comment may be linked to the same specific point in the content as the first comment, or to another point in the content. Additional sub comments may be linked to the first comment, or to other sub comments, for example.

A sub comment may be unlinked to the first comment. An unlinked sub comment may be treated as a first comment. An unlinked sub comment may be linked to a point in the content to which the sub comment refers.

Additionally, a sub comment may be transmitted to the first user without linking to the content, since the first user has already seen the content, for example. A first user may be alerted, of a subsequent sub comment, and may be invited to view the content playback anew, with new comments included, or to simply review the new comments without playback. In some embodiments, the alert may take the form of an email, a text message, a phone call or voice message, a social networking communication, a chat session, etc. A sub comment may thus be recorded asynchronously, in a manner similar to the first comment, to allow for subsequent watching of the sub comment at a second, specific point in the content playback.

Thus, in accordance with the disclosure, the value of commentary, such as the emotional, social, and/or educational value, may allow a shared experience between co-workers, family, media outlets, friends, and the like, corresponded to particular points in a content playback. The value placed on the shared experience by users may be associated with one or more payment schema, such as a subscription fee.

A device for rendering and/or displaying a playback of content, referred to herein as a display device, may receive data, and/or convert that data for display to a user. Such data may include video and/or audio for display to a user. The display device may be stationary or mobile, and may comprise, for example, a gateway, a set top box (STB), a computer, a phone, a cellular device, a video game device, a television or any other mobile or stationary device. The data may be provided by a content provider, an Internet Protocol television (IPTV) provider, an Internet service provider (ISP), or another content provider or source. For example, interaction may include selection of content to be delivered to a user, and/or feedback or commentary from the user or other users regarding the displayed or rendered content. According to the present disclosure, content may be provided to the user via one or more networks and/or bandwidth ranges under the control of the provider or similar entity.

In a content distribution network, a central office may remotely service a group of display devices, and as such may service a large group of users. Users may thus receive content from the central office directly or indirectly via display devices, as referenced above. For example, display devices may receive content directly from the central office, or via a device such as a gateway or a STB.

Figure 3:
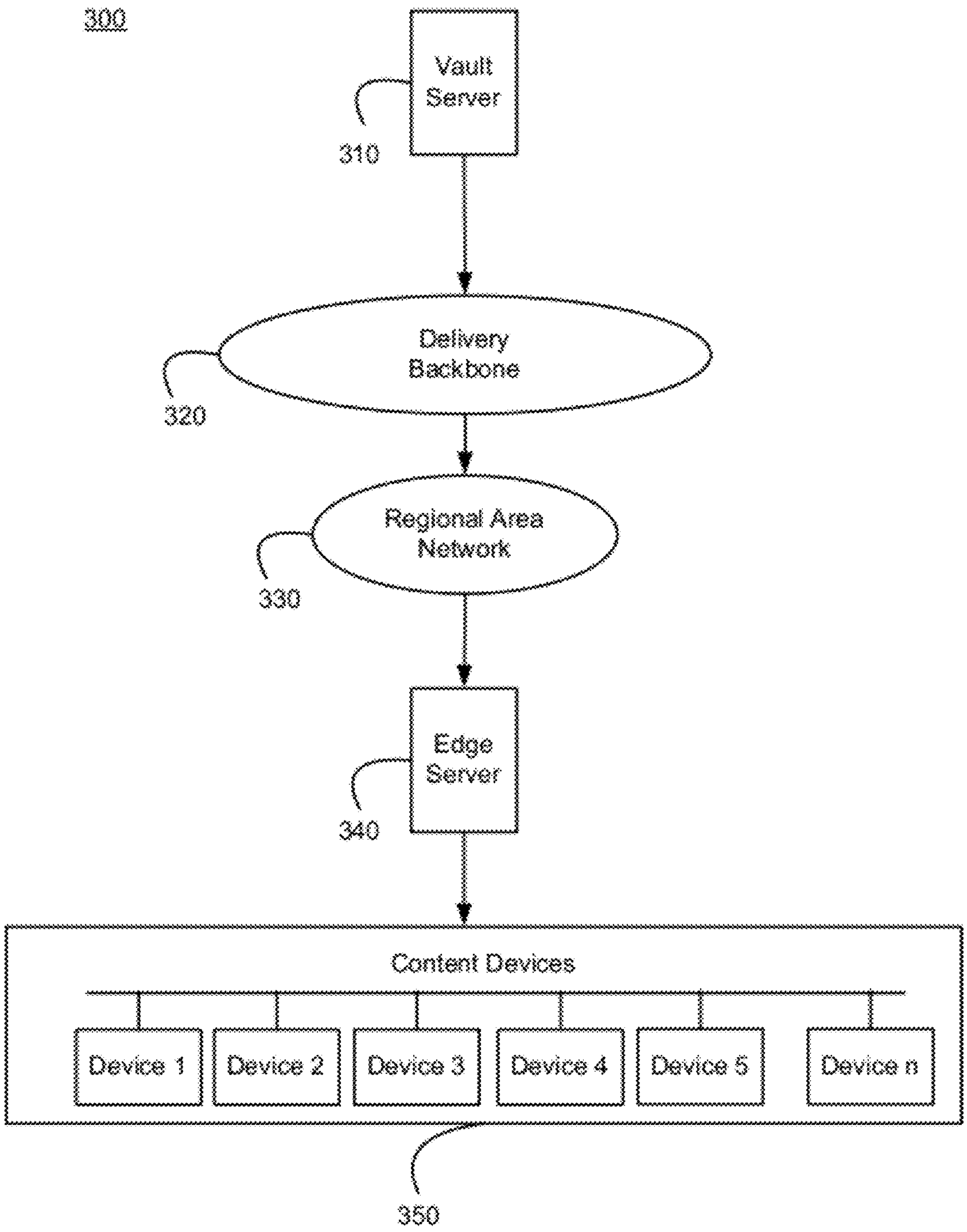
FIG. 3 is a block diagram illustrating a system for incorporating asynchronous comments in accordance with some aspects of the disclosure.

Referring now to FIG. 3, there is shown a block diagram of a system 300 for incorporating and/or providing comments during viewing and playback of content. In some embodiments, system 300 may include or incorporate one or more of the devices or components described above in connection with FIGS. 1-2. As illustrated, system 300 may include a vault server 310, a delivery backbone 320, a regional area network 330, one or more edge servers 340, and one or more devices 350.

Vault server 310 may be, or be within, a central office (e.g., central office 103 of FIG. 1), for example. Vault server 310 may include a central control device that may provide network functions such as remodulation, retiming, message accountability, contention control, diagnostic control, and access to a gateway. Vault server 310 may include a master facility for receiving content (e.g., audiovisual) signals, and for processing and distributing such signals over any type of medium, such as cable, fiber optic, or a wireless network, such as a local or wide are internet protocol or another packet switched network, for example.

Vault server 310 may be communicatively coupled to regional area network 330 directly or via backbone 320. Any number of regional area networks may be present. Similarly, any number of vault servers may be present. Interconnected with a given converged regional area network 330 may be one or more edge servers 340. Interconnected with edge server 340 may be at least one device 350, further denoted in FIG. 3 as devices 1, 2, 3, 4, 5, . . . , n. In some embodiments, device 350 may include or be associated with one or more display devices.

Vault server 310 may be a server that contains a plurality of available content assets. The plurality of assets, or titles, at vault server 310 may include all, or a subset of all, content available for request. By way of a non-limiting example, vault server 310 may be configured to store up to 100,000 video titles. Vault server 310 may additionally monitor data indicative of selections by, e.g., devices 350 and/or edge servers 340, and may therefrom provide distribution information and monitor statistics, such as statistics associated with each display device, subsets of display devices, and/or all display devices and users thereof. Vault server 310 may correlate a comment made by a user of system 300, such as a user of a device 350, to specific content, with appropriate associative information, such as with the appropriate timestamp and terminal identification/user identification, to link the comment to the user of the device 350 and to the particular point of the comment within the playback.

Delivery backbone 320 may include distribution components to allow for the distribution of content and associated commentary. For example, distribution components may include gateways, routers, servers, switches and the like, as would be understood by those of ordinary skill in the pertinent arts.

Regional area network 330 may take the form of any network capable of carrying audio, video and/or data. Regional area network 330 may allow audio, video, and data, such as IP, traffic over a single network, and/or may provide several and/or redundant networks.

Edge server 340 may include one or more servers, and may service a respective group of devices 350 found within a service area, such as within regional area network 330, of the respective edge server. Edge server 340 may contain all or a subset of the content available at the vault server 310. If edge server 340 receives a request for content, edge server 340 may stream or otherwise deliver that content to device 350.

Edge server 340 may service requests from a number of devices 350, and may send those requests to vault server 310. Edge server 340 may thus filter or screen requests, to thereby conserve bandwidth and system resources. Edge server 340 may manage connections and cache content, and may push or otherwise transmit data to devices 350. At edge server 340, the cached content may be cached in a memory and/or on a local storage device(s), for example. Edge server 340 may also correlate a comment made by a user of a device 350 to specific content with associated information, such as with a timestamp and/or commenting user information, for the comment to link to the particular point within the content playback and to the user leaving the comment. This correlation may be performed in conjunction with and/or in cooperation with vault server 310, for example.

Device 350 may receive user comments via an input, such as a keyboard, a remote control, a smartphone, or any other associated or paired device. The device 350 may relay the comment to the provider, such as to the vault server 310 or edge server 340, with associated information. The system 300 may store the comment at any point in the system, and/or relay the comment to other users, such as via respective devices 350 of those other users. For example, devices 350 may serve as transmitters and receivers, that is, transceivers, of commentary. Device 350 may receive signals from edge server 340, for example. Device 350 may accept and correlate a comment made by a user to specific content, such as with appropriate associative information. This correlation may be performed in conjunction and/or in cooperation with vault server 310, edge server 340, or both, for example. For example, device 350 may be or include an IP connection, such as via a PC, through which a comment may be received.

Vault server 310 and edge server 340 may operate to provide requested content, such as selected programming, to device 350. Such requested content may include video-on-demand (VOD) and/or switched-digital-video (SDV), for example. A user consuming the content may desire to leave an asynchronous comment, such as via device 350 or another device separate from or associated with device 350, for such comment to be associated with or incorporated into the content by the edge server 340 and/or to vault server 310.

In some embodiments, comments received from a user, or one more devices associated with the user, may be embedded into a content item or asset. For example, a copy of a content item may be created to facilitate including such comments in the copy. Alternatively, or additionally, a separate data structure (e.g., a file) may be created to store or hold comments, and the data structure may be associated with the content item or asset. Use of a separate data structure may minimize the storage capacity needed by avoiding a duplication of redundant content data. Other techniques for storing comments and associating the comments with the content may be used.

Figure 4:
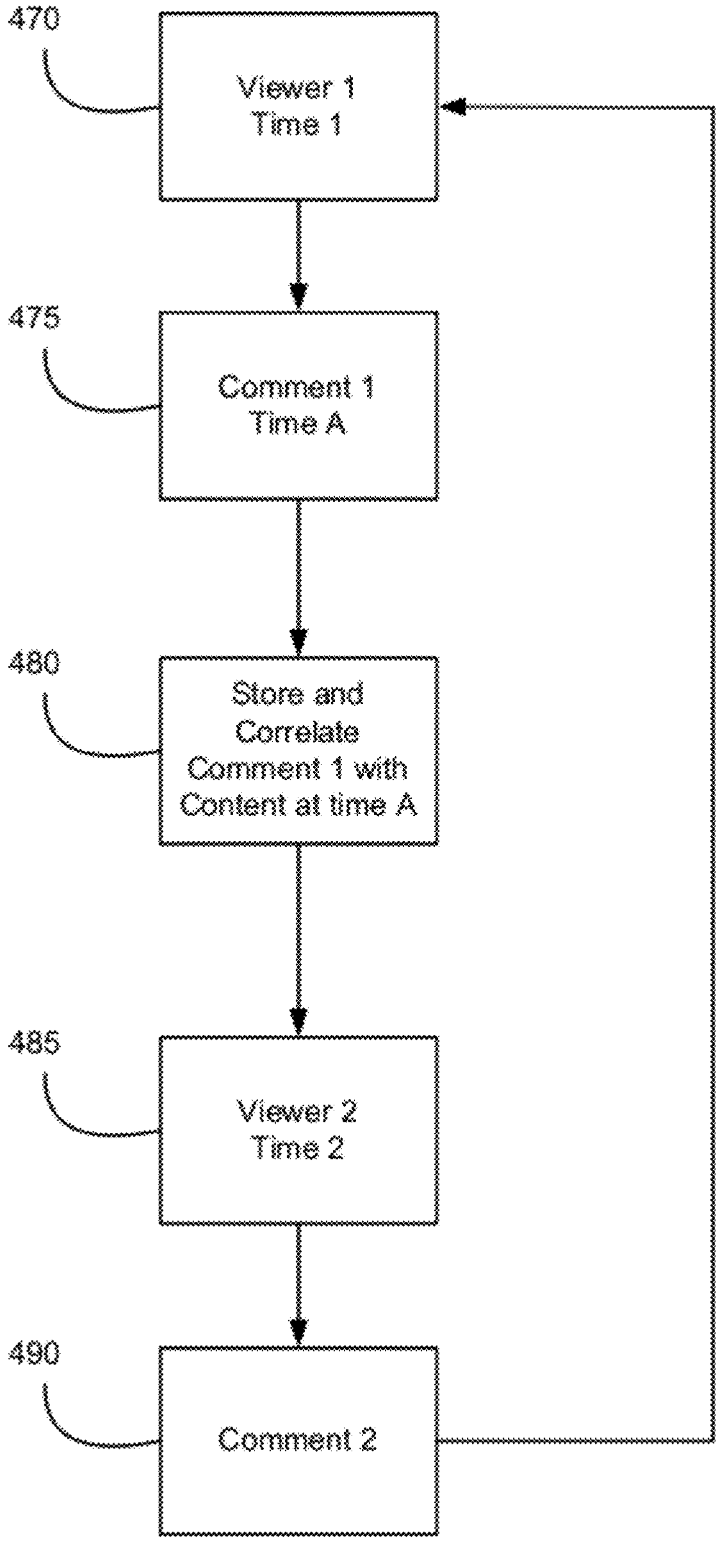
FIG. 4 is a flow diagram for storing asynchronous comments in accordance with some embodiments of the disclosure.

Referring now to FIG. 4, there is shown a flow diagram illustrating one method for storing a comment asynchronously for future playback. A first user, viewer 1, may view or consume content, such as video content, at a first point in time, time 1 at step 470. Time 1 may occur during an actual (e.g., linear) transmission of the content, for example, or during a requested or recorded viewing, such as a viewing via VOD or DVR, for example.

While watching the video at time 1, the first user may provide a comment, comment 1, at a specific point within the video at step 475, such as at time A, for example. Comment 1 may be stored by the network provider, such as at vault server 310 or edge server 340, for example, or at device 350. A user may interact, such as by typing in a comment using an on-screen keyboard, for example, with device 350, to leave comment 1 for an asynchronously viewed, non-linear playback. Further, the comment may be recorded and/or correlated by device 350, edge server 340, and/or vault server 310, for example, with the associated content at step 480.

Notifications that comment 1 has been left may be provided to users, e.g., as directed by viewer 1, such as to users who are listed in an address book of viewer 1, or to users in the social network or circle of friends of viewer 1, or as otherwise directed by viewer 1, for example. Viewer 1 and a user, such as a viewer 2, may be linked as members of a fan club for a particular television show and/or as members of any similar club, blog, site, or contact list, for example. For example, if the video under view is an episode of the show Lost, and viewer 1 leaves a comment at time A, notification of this comment may be delivered to the second viewer, such as by providing an email to the second viewer, or providing an alert during viewing of the show by the second viewer, for example, that states that a friend and watcher viewed an episode and left a comment regarding the episode, for example. The second viewer may be invited to click a link, and/or access a recording, for example, to view the episode and see viewer 1's commentary, or view the commentary alone. A notification may go to all "friends" linked to viewer 1, such as through Facebook®, Twitter®, or the like, or may go to a smaller subset of friends, such as those friends who have posts or discussions or emails or memberships about the specific content of the video. Alternatively, no notification may be sent, and the second viewer may simply be provided with viewer 1's comment at time A when watching the video.

For example, notification may be effectuated using any applicable social network function such as Facebook® connect, for example. Facebook® connect may provide a third party API toolset that readily provides for evaluation of friends, for example. Friends may be evaluated by examining online Facebook posts, email listings, or the like. Thereby, users may be evaluated in relation to the leaving of an asynchronous comment.

An address book may allow for a notification, such as in the form of an email or alert to contacts in the address book. The notification may indicate that the contacts should view or consume the content because a comment has been left. An address book may delineate contacts, such as regarding what contacts are to receive which notifications. The comment may, but need not, be provided in the notification.

The second viewer, upon receipt of the notification, or at a later time related or unrelated to the receipt of the notification, such as at time 2, may view the content at step 485, for example. While viewing or consuming the content, at time A within the content, viewer 1's comment (comment 1) may become accessible, such as viewable via a display to the second viewer. The second viewer may view or dismiss the comment, review the comment, and/or review the comment and provide a sub-comment (e.g., comment 2 490), for example. In the event the second viewer dismisses or views the comment, such as by interacting with device 350, the second viewer may continue viewing the video. The video may continue playing throughout the display or dismissal of viewer 1's comment.

As shown in FIG. 4, and in the event that the second viewer provides a sub comment, such as comment 2, for example, comment 2 may be recorded and/or correlated, e.g., by device 350, with a time stamp within or relative to the content then in view at step 490. Similarly, this correlation may be executed and the comment stored by edge server 340 and/or vault server 310, for example. Further, the sub-comment may be included or associated with comment 1, or may be stored as a separate comment. The second viewer may reply to comment 1, such as by providing the sub-comment as a reply comment, which may allow the first viewer to receive the reply comment, for example.

Multiple storage and/or correlation locations may be used for delivery of content to individuals identified by a user, such as correlation to addresses stored in a user's address book, for example. The correlated comment may be recorded on and/or delivered to, for example, device 350, edge server 340, vault server 310, or personal computing system associated with a user or a comment recipient. Thus, device 350 may be utilized as a user input to record comments. Edge server 340 may perform the correlation between the comment and the content, such as, for example, to notify the input comment recipients who are accessible through edge server 340 and/or vault server 310.

By way of example, comment 1 may state, such as with respect to an episode of the show "Lost," "I cannot believe that Jack is hiding there." A second viewer may be on a list of recipients of "Lost" related comments, and/or of comments from the first viewer, and may thus receive comment 1. Second viewer may submit responsive comment 2, such as "yes, I too was surprised by the hiding spot, but that is where Kate hid in episode 8." Comment 2 may thus start a thread of comments originating from comment 1. Subsequent comments may further populate the thread, and the entire thread may be temporally associated with time A within the content for all authorized recipients along the thread.

Alternatively, comment 2 may be related to comment 1, but not be established as a sub comment. Thereby comment 2 may be treated as starting a new thread. Alternatively, comment 2 may be unrelated to comment 1, and may thus start a new thread.

Thus, commentary may be provided via device 350, and/or online, about an audiovisual playback of content, for example. The commentary may be provided asynchronously, and correspond to specified times within asynchronous viewings, thereby ensuring that the plotline and other details will not be adversely affected for some users by the commentary.

Figure 5:
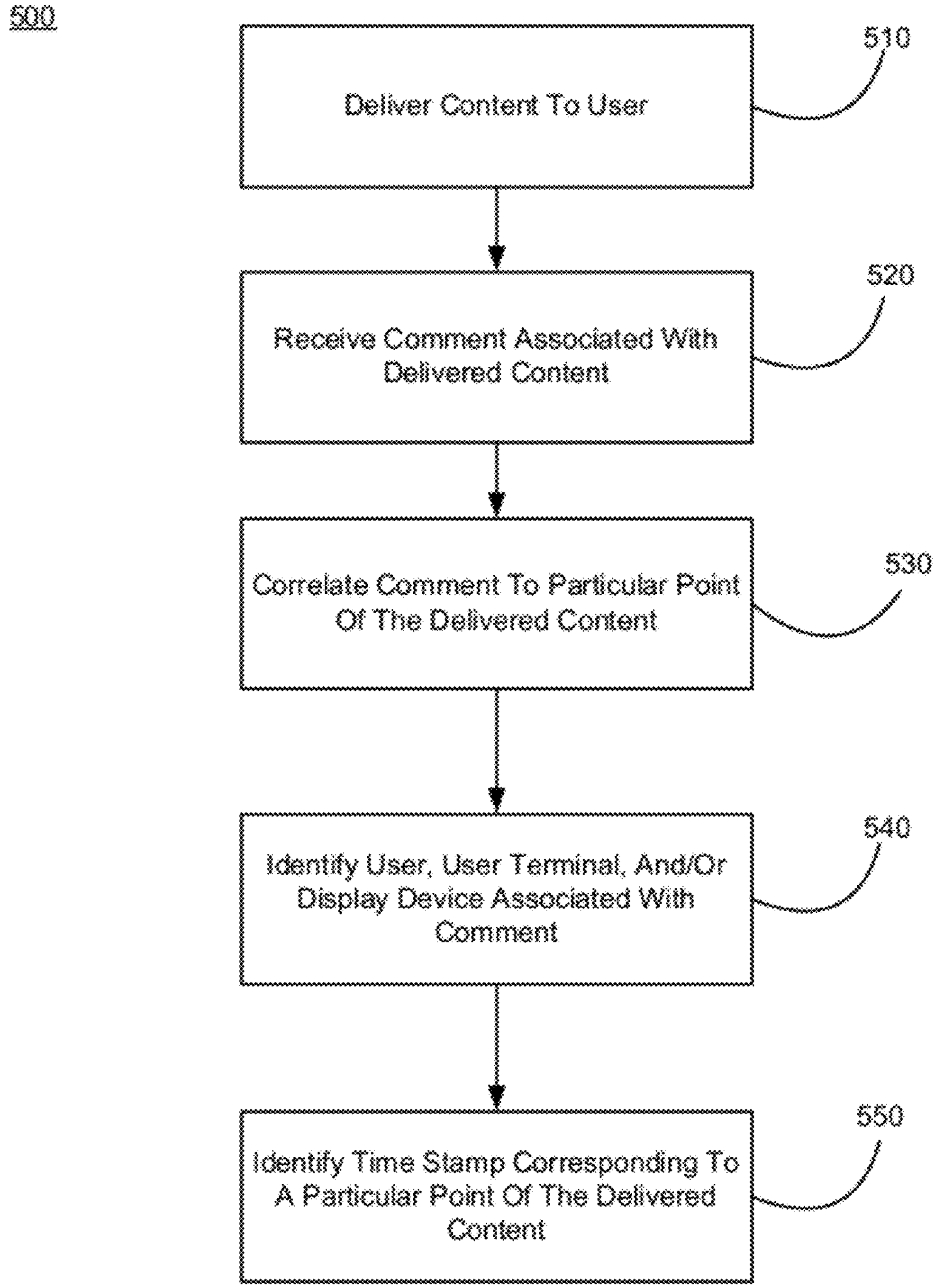
FIG. 5 is a flow diagram illustrating a method of asynchronous interaction in accordance with some aspects of the disclosure.

Referring now to FIG. 5, there is shown a block diagram illustrating a method of asynchronous interaction at specific times in a playback of content. Method 500 may include delivering specific content to a user at step 510, receiving a comment associated with the delivered specific content at step 520, correlating the received comment with a particular point of the content at step 530, identifying the user who provided the received comment as well as the user's terminal and/or other associated device at step 540, and identifying the timestamp corresponding to a particular point of the delivered specific content at step 550.

Delivering specific content to a user at step 510 may include the delivery from a provider of, for example, data, television content, music, videos, and the like, to a user via device 350. Delivering of content at step 510 may include delivery via any methodology, such as real-time broadcast, SDV, or VOD, for example.

Receiving a comment associated with the delivered content at step 520 may include receiving, such as via a device 350, a comment associated with the content. Particular methods of receiving may include receiving a comment from device 350, such as via an input interface, such as a remote control or keyboard, a STB, a phone, a computer or the like, for example. Thus, receipt of a comment may include receipt via an IP transmission, such as from a social networking site, including Twitter® and Facebook,® for example, or such as from email and the like. Comments may be captured via, for example, receipt of an indication by the user that the comment is to be submitted tied to certain content, or by a keyword monitoring of sites for which the user is a member, for example. Further, receipt of a comment, such as via telephone, may include receiving audio and recording the audio, or text, or video, of a comment associated with the content.

A contact that is notified or otherwise alerted when a comment is left may include a friend, colleague, family member, or the like, and may be identified by the user upon making a comment, or prior to making any comments, for example. A contact list may include contacts, such as Facebook®, Twitter® and/or other social networking site contacts, for example. The contact list may include a group of individuals selected from an address book, for example. Additionally, the contact list may be filtered to create a list directed to a specific topic, such as friends who enjoy Lost, as discussed hereinabove. Such a filter may use any pertinent feature of a contact or accessible contact's profile, such as sex, race, geographic location, age, height, weight, likes and dislikes, and the like. Further, the filter may include content that the contact has commented on or reviewed in the past.

Correlating, or otherwise associating, the received comment with a particular point and/or time in the content at step 530 may be performed by the provider of the content, such as at vault server 310, for example. Alternatively or in addition, this association may occur at an intermediate location, such as at edge server 340, for example. Further, this association may occur at device 350, for example.

In particular, the server or device that performs the correlating step 530 may vary based on the specific methodology used for receiving the comment. For example, if a comment is received via a display device or terminal (e.g., a STB), the correlation of the comment at step 530 to a specific point in the content may include a correlation at the display device or terminal, a correlation at an edge server, and/or a correlation at a vault server, for example.

If a comment is received from a computer via an IP network delivery, for example, the correlation of the comment to the content may be performed using feedback from the computer and the IP network connectivity of the computer, for example. By way of a non-limiting example, the computer may send out a test signal to determine the lag time that is required for a comment to be received. Knowing such a lag time may allow correlation to the content by subtracting such lag time from the time the comment is received. Such comment may also be transmitted to the central office, or another storage or processing location of the provider, and correlated with the content at that location, such as based on a time counter associated with each program, for example.

When a comment is received via telephone, the correlation between the content and the comment may be achieved using a recording of a voice message left via the telephone, a receipt of a short message system (SMS) message, or the like, for example. Such a telephonic comment may be correlated with the content at the central office, for example.

Identifying the user who provided the received comment at step 540 may include providing an identifier, such as a display device or terminal identifier, a name, an online handle, or the like. Identifying information may be included based on the method of receiving, such as receiving via a STB, computer, PDA or phone, for example. Like an email system, an account may be created to identify correspondence from device 350, for example, and such an account may include a device address, a computer network address, and/or a phone number, for example.

Identifying the timestamp of the correlated point of the content at step 550 may include noting and recording the time within the content that a comment is received or initiated via a user input, or a time within the content that the user chooses (e.g., at the end of the content, or in a portion of the content reserved for comments), for example. By way of a non-limiting example, a user may provide an indication, such as pressing a key to identify or "lock" the point in the content, thereby allowing an unlimited amount of time to enter or type the comment. Step 550 may include identifying any lag time in delivery of the comment, such as the time it takes for the comment (or the indication of the lock) to be delivered or transmitted from the initial comment to the location where the comment is recorded and correlated with the content. Assessment of the lag time may allow for removal of lag time in determining the timestamp of the comment.

For example, if the comment is provided by a user using device 350, and the comment is recorded and correlated with the content at vault server 310, a lag time may exist in the comment reaching vault server 310. If not accounted for, the lag time may cause the displayed content to have already moved passed the point of the content to which the comment is to be correlated. Thus, lag time should be removed so that the comment is correlated with the appropriate point in the content. Alternatively, device 350 may timestamp the comment immediately upon input of the comment, thereby minimizing or eliminating lag time.

Referring now to FIG. 6, there is shown an example of information storage 600 to incorporate and correlate the information regarding a comment as discussed herein. As seen in FIG. 6, information stored to reproduce a comment left during playback may include an identification of the commenting user at field 610, the substance of the comment at field 620, the content that the comment relates to at field 630, and a timestamp of the content referencing the specific point, such as the specific time, related to the comment at field 640.

Comment in field 620 may be associated with a time stamp, such as in field 640, in relation to the content of the show referenced in field 630 to which comment 620 related. Information storage 600 may take the form of a database, for example. Database 600 may be stored, or accessed, by device 350, edge server 340, or vault server 310, for example.

Commenting or sub commenting may further be identified in table 600 using user 610, comment 620, content 630 and timestamp 640 identifier, as described or other information as necessary or desirable. Comments or sub comments may further be stored as links to a previous comment in a chain, for example, and may also identify the "original" comment that started the comment chain. This linking may be stored as a hierarchy, and/or a thread, for example. Similarly, the comments may be linked in an email or text string.

If a user 610 identifies ten (10) friends, for example, to receive information regarding comments 620 that that user 610 leaves, the ten friends may be alerted to the comment, and may be provided with a link to the content referenced in field 630, with the comment associated at timestamp 640, for example. Further, comment chains may be created, wherein a first comment is left in the content and a second comment is made with respect to the first comment, or with respect to the same place 640 in content 630, for example.

A comment, a discussed herein may take any form indicated to those skilled in the art based on the disclosure herein, such as pop-ups, banners, or audio-played comments and combinations thereof, for example. A pop-up or banner may be a window or box that is added to the display to provide additional information. A pop-up or banner may be a new window that is overlaid on the screen, onto a portion of the screen, or that is ghosted onto the screen, for example, wherein the new window may include a comment linked to the point of the content that is currently being displayed underneath the pop-up, for example.

Figure 7:
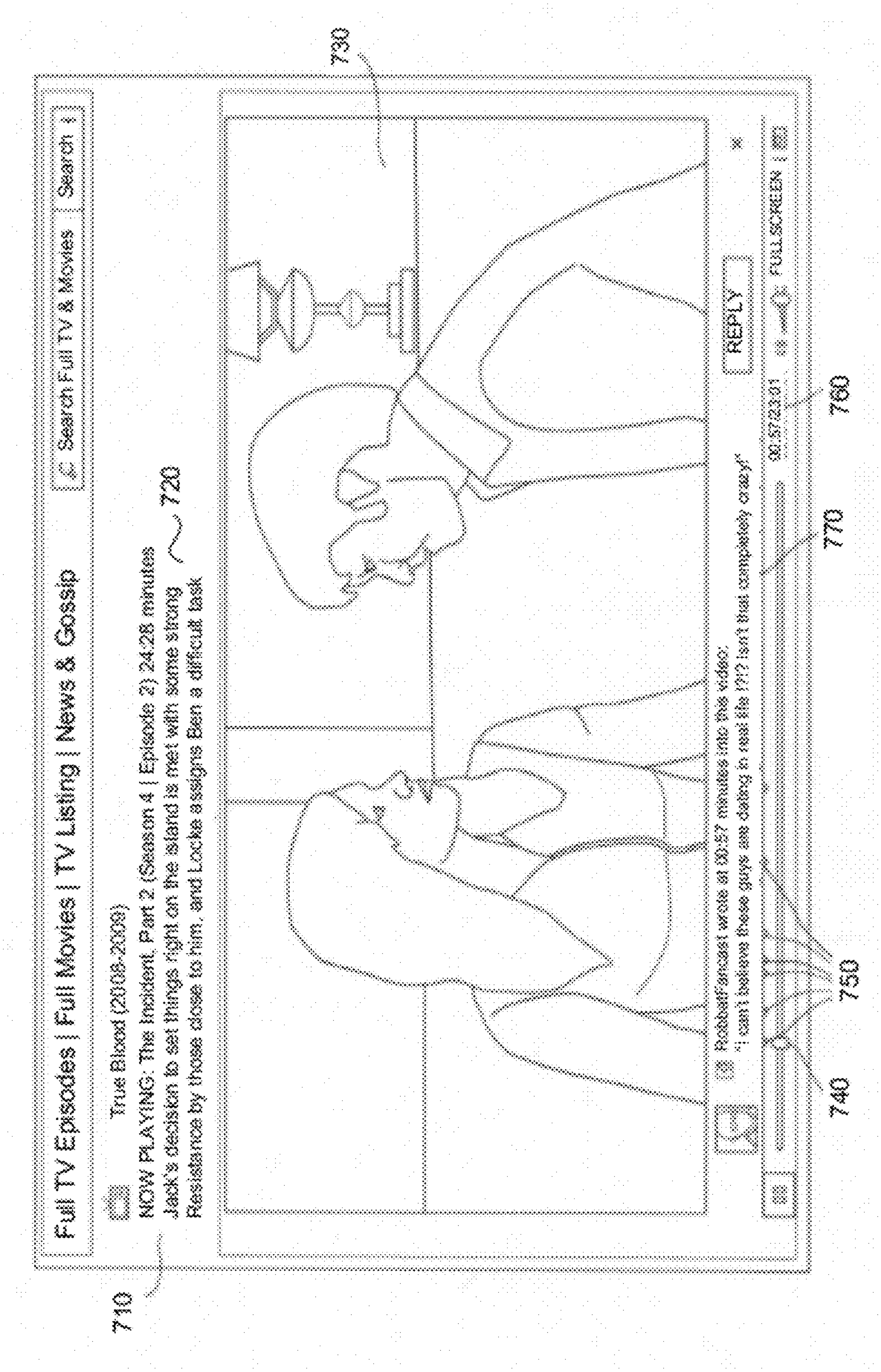
FIG. 7 is a screen illustration showing a display of asynchronous comments within a video play in accordance with some aspects of the disclosure.

Referring now to FIG. 7, there is shown a banner display of asynchronous comments in a video play. FIG. 7 illustrates an example of the television series "True Blood," from Season 4/Episode 2, entitled "The Incident, Part 2" 710. A portion of the display provides information about the episode in text format 720. Another portion of the display displays the content 730, and may include a banner having a bar that monitors the progress of the episode 740, for example. An illustrative banner 740 is shown in the example of FIG. 7, just below the video content 730. Of course, those skilled in the art may appreciate that the portions of the display may not be distinct, separated or visually allotted in the manner specifically illustrated, but may instead constitute overlays, be allotted to different areas of a display, or the like, for example.

A series of comments may be tagged or otherwise denoted throughout the episode, and this tagging is illustrated using triangle markers 750 in FIG. 7. Those skilled in the art will appreciate that other markers may be used to illustrate tagging of commentary. As the viewer reaches the point 760 at which a comment is left within the episode, shown as 00:57 in FIG. 7, the comment 770, and/or comment tag, associated with that timestamp may appear. In the illustrated case, the comment, "I can't believe these guys are dating in real life!?!? Isn't that completely crazy!" is displayed for the viewer of the episode.

Figure 8:
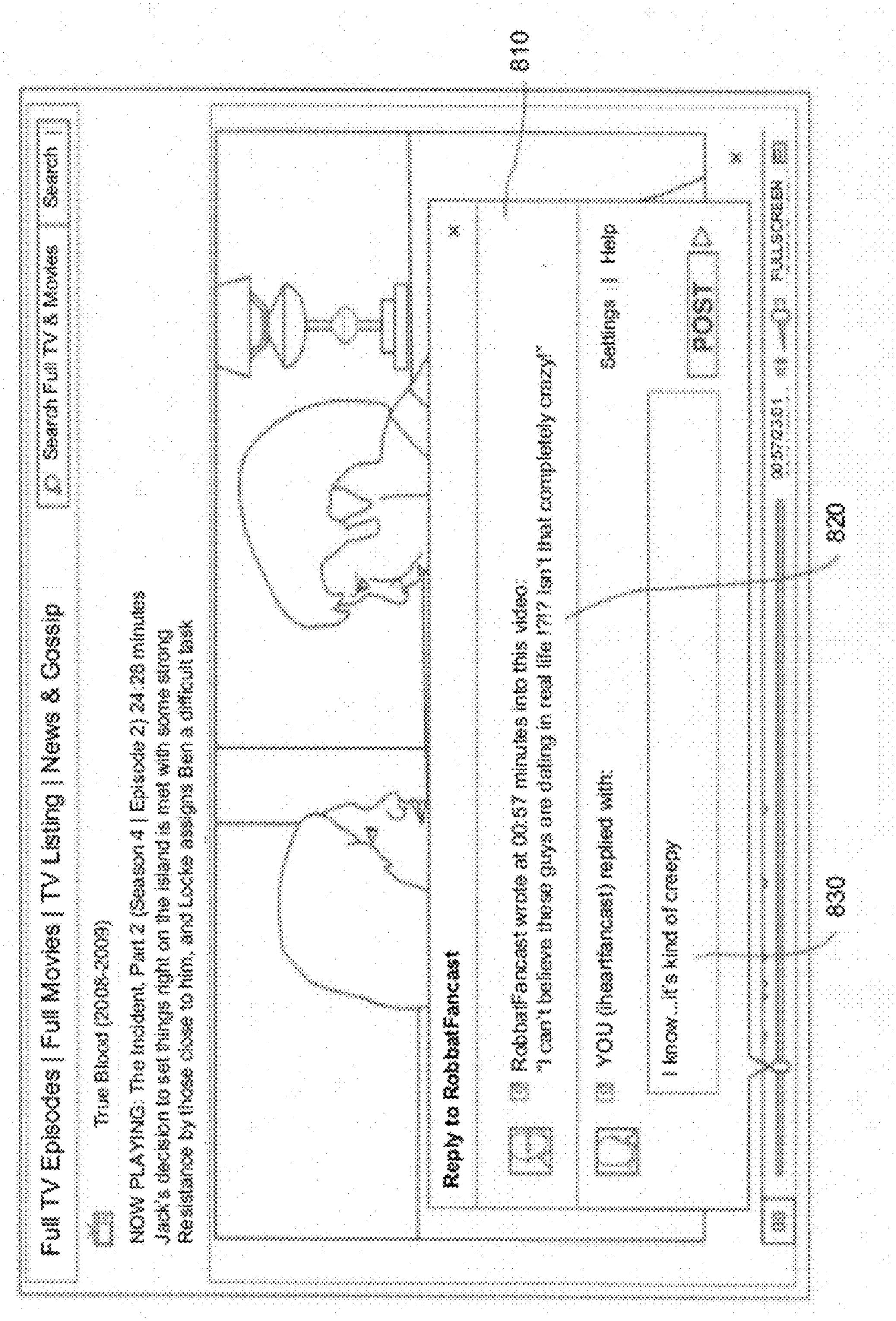
FIG. 8 is a screen illustration showing a display of asynchronous comments within a video play in accordance with some aspects of the disclosure.

Referring now to FIG. 8, there is shown a banner display of asynchronous comments in content. As shown in FIG. 8, a pop-up window 810 may be provided, and may be overlaid atop the content. In this illustration, the screen may be substantially similar to that shown and described with respect to FIG. 7. Upon reaching the point in the episode referenced with respect to FIG. 7, namely 00:57, the tagged comment 820 may pop up in a window as shown in the example of FIG. 8, and may provide for a reply to be typed in and posted 830, such as by the click of a button, synchronously or asynchronously with the content playback and/or the prior comment. As shown in FIG. 8, the responsive comment, "I know . . . it's kind of creepy . . . ," may be tagged to the content, and may be subsequently available for entitled users.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, content may distributed to a user location or user premises via one or more computing devices (e.g., servers) and that content may be accessed or displayed at the user location via one or more terminals and/or display devices. The content may be formatted in accordance with one or more transmission techniques, types, or protocols, such as broadcast and narrowcast and reassignment or requalification between the various techniques, types, or protocols may be facilitated based one or more factors or criteria. More generally, one or more computers may include one or more processors and memory storing instructions, that when executed, perform the methodological acts and processes described herein. Furthermore, the methodological acts and processes described herein may perform a variety of functions including transforming an article (e.g., content distributed at a first time to a first user or first user terminal) into a different state or thing (e.g., content comprising one or more comments distributed at a second point in time to a second user or second user terminal, the one or more comments optionally corresponding to comments made by the first user or first user terminal at the first point in time).

Although the disclosure has been described and pictured in an illustrative form with a certain degree of particularity, it is understood that the present disclosure of the illustrative form has been made by way of example, and that numerous changes in the details of construction and combination and arrangement of parts and steps may be made without departing from the spirit and scope of the disclosure as set forth in the claims hereinafter.

What is claimed is:

1. A method comprising:

receiving, by a first computing device from a second computing device via a network, a comment associated with content being output to a user associated with the second computing device;

determining a specific time in the content based on a lag time of a signal transmitted between the first computing device and the second computing device and based on an indication of a time that the user initiated entry of the comment;

correlating, by the first computing device, the comment with the specific time in the content;

storing, by the first computing device, the comment, the specific time associated with the comment, and an identifier of the second computing device or the user associated with the comment;

determining, by the first computing device, a plurality of contacts associated with the user;

after receiving the comment, determining, by the first computing device based on the content and information regarding interests of the plurality of contacts, a subset of contacts, among the plurality of contacts, that are expected to be interested in the content; and transmitting, by the first computing device to a third computing device associated with at least one of the subset of contacts, a notification of the comment or transmitting, by the first computing device to the third computing device, the comment to cause the comment to be output to the at least one of the subset of contacts at the specific time in the content.

2. The method of claim 1, wherein the transmitting the comment comprises transmitting the comment with the content, wherein the content comprises switched-digital-video (SDV) content or video-on-demand (VOD) content.

3. The method of claim 1, further comprising:

receiving a short message system message comprising a second comment associated with the content;

receiving an indication that a second user initiated entry of the second comment; and correlating, by the first computing device, the second comment with a second time in the content based on the indication, the second time corresponding to a time in the content when the second user initiated entry of the second comment.

4. The method of claim 1, further comprising:

receiving a second comment associated with the content via an internet protocol network; and correlating, by the first computing device, the second comment with a second specific time in the content.

5. The method of claim 1, wherein the correlating comprises correlating, by an edge server, the comment with the specific time in the content.

6. The method of claim 1, further comprising identifying the second computing device or the user associated with the second computing device based on a phone number associated with the second computing device.

7. The method of claim 1, wherein the transmitting the notification comprises:

sending an email comprising a link to access the comment.

8. The method of claim 1, wherein the notification is configured to cause an alert to be output to the at least one of the subset of contacts at the specific time in the content, the alert indicating that the comment is available.

9. The method of claim 1, wherein the receiving the comment comprises:

receiving a voice message during a phone call, the voice message comprising the comment; or receiving a short message system message comprising the comment.

10. The method of claim 1, further comprising:

prior to the receiving the comment, transmitting the content to the second computing device via a content distribution network, wherein the second computing device comprises a terminal, wherein the receiving, by the first computing device from the second computing device via the network, the comment comprises receiving, by the first computing device from the terminal via the content distribution network, the comment.

11. The method of claim 1, wherein the determining the subset of contacts comprises:

determining that the user is a member of a club related to the content; and determining at least one other member of the club as the subset of contacts.

12. The method of claim 1, wherein the determining the plurality of contacts comprises determining other users linked to the user through a social network communication system.

13. The method of claim 12, wherein the determining the subset of contacts comprises determining those of the plurality of contacts that have posted, via the social network communication system, information associated with the content.

14. The method of claim 1, wherein the determining the plurality of contacts comprises determining other users identified in an address book of the user.

15. The method of claim 14, wherein the determining the subset of contacts comprises determining those of the plurality of contacts that have received or sent an email comprising information associated with the content.

16. The method of claim 14, wherein the determining the subset of contacts comprises filtering the address book based on profiles of the other users identified in the address book to determine those that are expected to be interested in the content.

17. An apparatus comprising:

one or more processors; and memory storing computer-executable instructions that, when executed by the one or more processors, cause the apparatus to:

receive, from a first computing device via a network, a comment associated with content being output to a user associated with the first computing device;

determine a specific time in the content based on a lag time of a signal transmitted between the apparatus and the first computing device and based on an indication of a time that the user initiated entry of the comment;

correlate the comment with the specific time in the content;

store the comment, the specific time associated with the comment, and an identifier of the first computing device or the user associated with the comment;

determine a plurality of contacts associated with the user;

after receiving the comment, determine, based on the content and information regarding interests of the plurality of contacts, a subset of contacts, among the plurality of contacts, that are expected to be interested in the content; and transmit, to a second computing device associated with at least one of the subset of contacts, a notification of the comment or transmit, to the second computing device, the comment to cause the comment to be output to the at least one of the subset of contacts at the specific time in the content.

18. The apparatus of claim 17, wherein the computer-executable instructions, when executed by the one or more processors, further cause the apparatus to:

determine that the user is a member of a club related to the content; and determine at least one other member in the club as the subset of contacts.

19. The apparatus of claim 17, wherein determining the plurality of contacts comprises determining other users linked to the user through a social network communication system.

20. The apparatus of claim 19, wherein determining the subset of contacts comprises determining at least one of the plurality of contacts that has posted, via the social network communication system, information associated with the content.

21. The apparatus of claim 17, wherein determining the plurality of contacts comprises determining other users identified in an address book of the user.

22. The apparatus of claim 21, wherein determining the subset of contacts comprises determining at least one of the plurality of contacts that has received or sent an email comprising information associated with the content.

23. The apparatus of claim 21, wherein determining the subset of contacts comprises filtering the address book based on profiles of the other users identified in the address book to determine those that are expected to be interested in the content.

24. A non-transitory computer-readable storage medium storing computer-executable instructions that, when executed by at least one processor, cause a first computing device to:

receive, from a second computing device via a network, a comment associated with content being output to a user associated with the second computing device;

determine a specific time in the content based on a lag time of a signal transmitted between the first computing device and the second computing device and based on an indication of a time that the user initiated entry of the comment;

correlate the comment with the specific time in the content;

store the comment, the specific time associated with the comment, and an identifier of the second computing device or the user associated with the comment;

determine a plurality of contacts associated with the user;

after receiving the comment, determine, based on the content and information regarding interests of the plurality of contacts, a subset of contacts, among the plurality of contacts, that are expected to be interested in the content; and transmit, to a third computing device associated with at least one of the subset of contacts, a notification of the comment or transmit, to the third computing device, the comment to cause the comment to be output to the at least one of the subset of contacts at the specific time in the content.

25. The non-transitory computer-readable storage medium of claim 24, wherein determining the subset of contacts comprises determining that the subset of contacts and the user are members of a group associated with the content.

26. The non-transitory computer-readable storage medium of claim 24, wherein the computer-executable instructions, when executed by the at least one processor, cause the first computing device to transmit the content with the comment incorporated therein, and wherein the content comprises on-demand content.

* * * * *